(12) United States Patent
Aggarwal et al.

(10) Patent No.: US 10,108,535 B2
(45) Date of Patent: Oct. 23, 2018

(54) WEB APPLICATION TEST SCRIPT GENERATION TO TEST SOFTWARE FUNCTIONALITY

(71) Applicant: Accenture Global Solutions Limited, Dublin (IE)

(72) Inventors: Ankur Aggarwal, Pune (IN); Nitin Porwal, Pune (IN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 173 days.

(21) Appl. No.: 15/205,427

(22) Filed: Jul. 8, 2016

(65) Prior Publication Data

US 2018/0011780 A1    Jan. 11, 2018

(51) Int. Cl.
*G06F 9/44* (2018.01)
*G06F 11/36* (2006.01)

(52) U.S. Cl.
CPC ................ *G06F 11/3672* (2013.01)

(58) Field of Classification Search
None
See application file for complete search history.

(56) References Cited

U.S. PATENT DOCUMENTS

| | | | | |
|---|---|---|---|---|
| 9,104,810 | B2* | 8/2015 | Zhang | G06F 11/3684 |
| 2004/0215719 | A1* | 10/2004 | Altshuler | G06F 17/3089 709/204 |
| 2007/0162840 | A1* | 7/2007 | Rochelle | G06F 17/2247 715/210 |
| 2011/0161395 | A1* | 6/2011 | O'Donnell, III | G06F 11/3414 709/203 |
| 2011/0276944 | A1* | 11/2011 | Bergman | G06F 11/3684 717/124 |
| 2016/0283353 | A1* | 9/2016 | Owen | G06F 11/3664 |
| 2016/0299936 | A1* | 10/2016 | Chavda | G06F 11/36 |
| 2017/0185509 | A1* | 6/2017 | Arkadyev | G06F 11/3696 |
| 2017/0300405 | A1* | 10/2017 | Yashayeva | G06F 11/3692 |
| 2017/0324803 | A1* | 11/2017 | Shaath | H04L 67/025 |

OTHER PUBLICATIONS

Singh, Virender. "What is Gherkin - Bdd Language?" Tools Qa, 31 Dec. 2014, <toolsqa.com/cucumber/gherkin/>. Accessed 5 Feb. 2018.*
Wynne, Matt. "Strict Mode." Relish, Apr. 5, 2015, relishapp.com/cucumber/cucumber/docs/cli/strict-mode. Accessed Jun. 21, 2018.*

* cited by examiner

*Primary Examiner* — Qing Chen
*Assistant Examiner* — Binh Luu
(74) *Attorney, Agent, or Firm* — Mannava & Kang, P.C.

(57) ABSTRACT

According to an example of the present disclosure, a test script to test a web application is generated from a test case and web objects extracted from a web application. A web application testing tool may be invoked to test a functionality of the web application by executing the test script.

19 Claims, 13 Drawing Sheets

Feature: Validate the Mortgage Finance Calculator

Scenario: To validate the Existence of all the fields and labels

When I "Launch" on "" with "_Data_APPLICATION_URL"
Then I should "Verify" the "TEXT_MORTGAGEREFINANCECALCULATOR-CHASEMORTGAGE_LF_LOANAMTHOWELL" with "_Data"
And I should "Verify" the "TEXT_MORTGAGEREFINANCECALCULATOR-CHASEMORTGAGE_LF_TERMYRS2HOWELL" with "_Data"
And I should "Verify" the "TEXT_MORTGAGEREFINANCECALCULATOR-CHASEMORTGAGE_LF_MONTHSPAIDHOWELL" with "_Data"
And I should "Verify" the "TEXT_MORTGAGEREFINANCECALCULATOR-CHASEMORTGAGE_LF_INTRATE2HOWELL" with "_Data"

FIG. 3A

| | A | B | C | D |
|---|---|---|---|---|
| 1 | TestCaseName | APPURL | Term | TextValidator |
| 2 | Scenario1 | https://www.chase.com/mortgage | 10 | 20 |
| 3 | | | | |
| 4 | | | | |
| 5 | | | | |

```
@Before:
Scenario Name:scenario1
Automation Driver Initiated...
Wait Driver Initiated...
Fetching Keywords...
Executing ->When_I_Launch_on__with_APPURL
Keyword to be executed : Launch
Locator Type :
Locator Value :
Test Data is : https://www.chase.com/mortgage
Snapshot path is :C:\BDD_Runner\OUTPUT\snapshots\scenario1\When_I_Launch_on__with_APPURL
When_I_Launch_on__with_APPURL --> Executed sucessfully
Executing ->When_I_Click_on_LINK_MORTGAGEHO_PRODUCTS_&_PRIMARYMENU0503_with__
Keyword to be executed : Click
Locator Type : xpath
Locator Value : .//*[@id='primarymenu0']
Test Data is :
Snapshot path is :C:\BDD_Runner\OUTPUT\snapshots\scenario1\When_I_Click_on_LINK_MORTGAGEHO_PRODUCTS_&_P
When_I_Click_on_LINK_MORTGAGEHO_PRODUCTS_&_PRIMARYMENU0503_with__ --> Executed sucessfully
Executing ->When_I_Click_on_LINK_MORTGAG_MORTGAGEHO_MENUITEM0_0_7407_with__
Keyword to be executed : Click
Locator Type : xpath
Locator Value : .//*[@id='menuItem0_0_7']
Test Data is :
Snapshot Path is :C:\BDD_Runner\OUTPUT\snapshots\scenario1\When_I_Click_on_LINK_MORTGAG_MORTGAGEHO_MENU
Execution Incomplete: - Failure Encounteredchrome not reachable
  (Session info: chrome=50.0.2661.102)
  (Driver info: chromedriver=2.21.371459 (36d3d07f660ff2bc1bf28a75d1cdabed0983e7c4),platform=Windows NT
Command duration or timeout: 2.48.2', revision: '4lbecdd', time: '2015-10-09 19:59:12'
Build info: version: '2.10 seconds
```

FIG. 6C

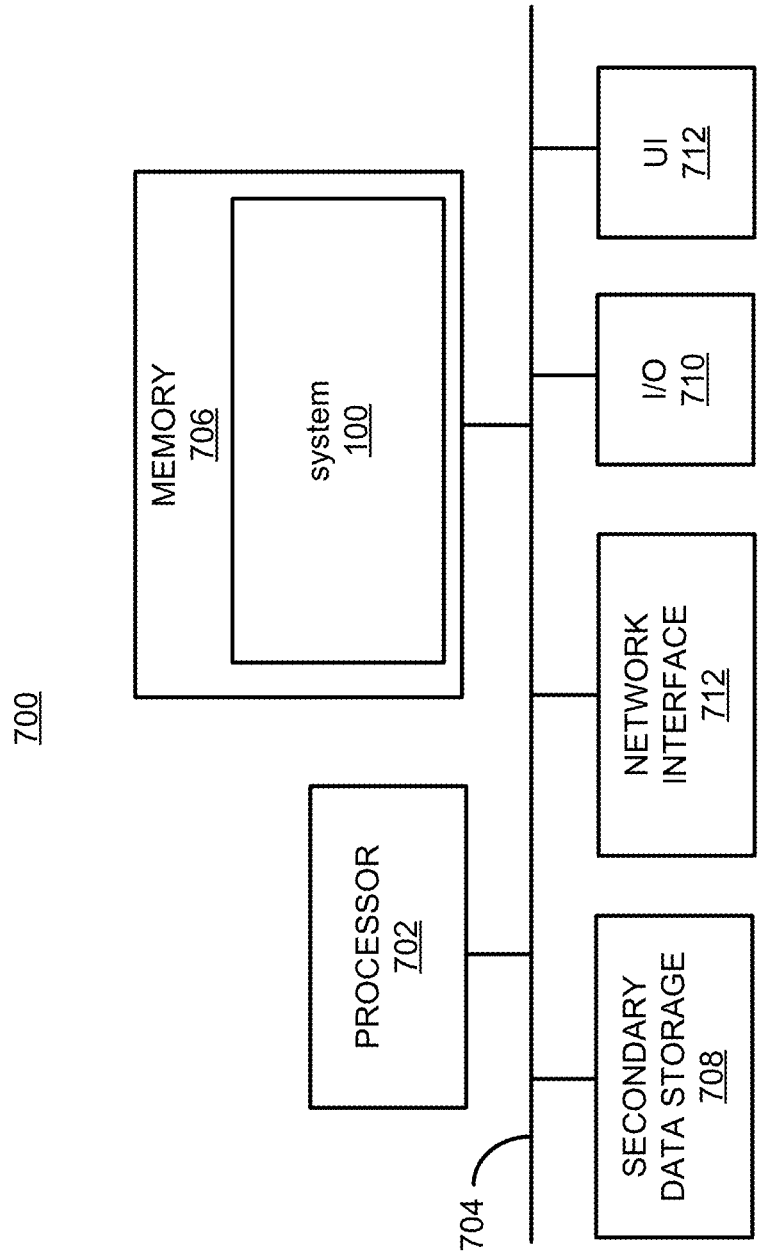

WEB APPLICATION TEST SCRIPT GENERATION TO TEST SOFTWARE FUNCTIONALITY

BACKGROUND

Software testing is becoming increasingly important. Owners, operators, and users of computer software expect and demand high standards of reliability. If a software system experiences failures, data integrity can be affected (e.g., data can be lost or corrupted).

There are many well-known approaches and available software tools for performing software testing during the development of a software application. During various phases of testing, a series of test cases may be generated by a tester or developer, and executed using a particular software testing tool to test various functionalities of the of software application under test. For example, in order to test different functions related to a software application, different test cases may be generated and executed to test the different functions of the software application.

Software applications range in complexity. However, whether the software application is a mobile application or a more complex enterprise business application, the software application may be tested using one or more software testing tools. Also, many test cases may be created by the software developers for particular software testing tools to test various functionalities of the software application.

BRIEF DESCRIPTION OF DRAWINGS

Features of the present disclosure are illustrated by way of examples shown in the following figures. In the following figures, like numerals indicate like elements, in which:

FIGS. 3A-E illustrate test cases, a validation failure, and a test script generated from a test case, according to examples of the present disclosure;

FIG. 5A shows test data, according to an example of the present disclosure;

FIG. 5B shows a file including web objects, test data, and configuration data, according to an example of the present disclosure;

FIGS. 6A-C show test result information that may be included in test result reports, according to examples of the present disclosure;

FIG. 7 illustrates a hardware platform, according to an example of the present disclosure.

DETAILED DESCRIPTION

Figure 1:
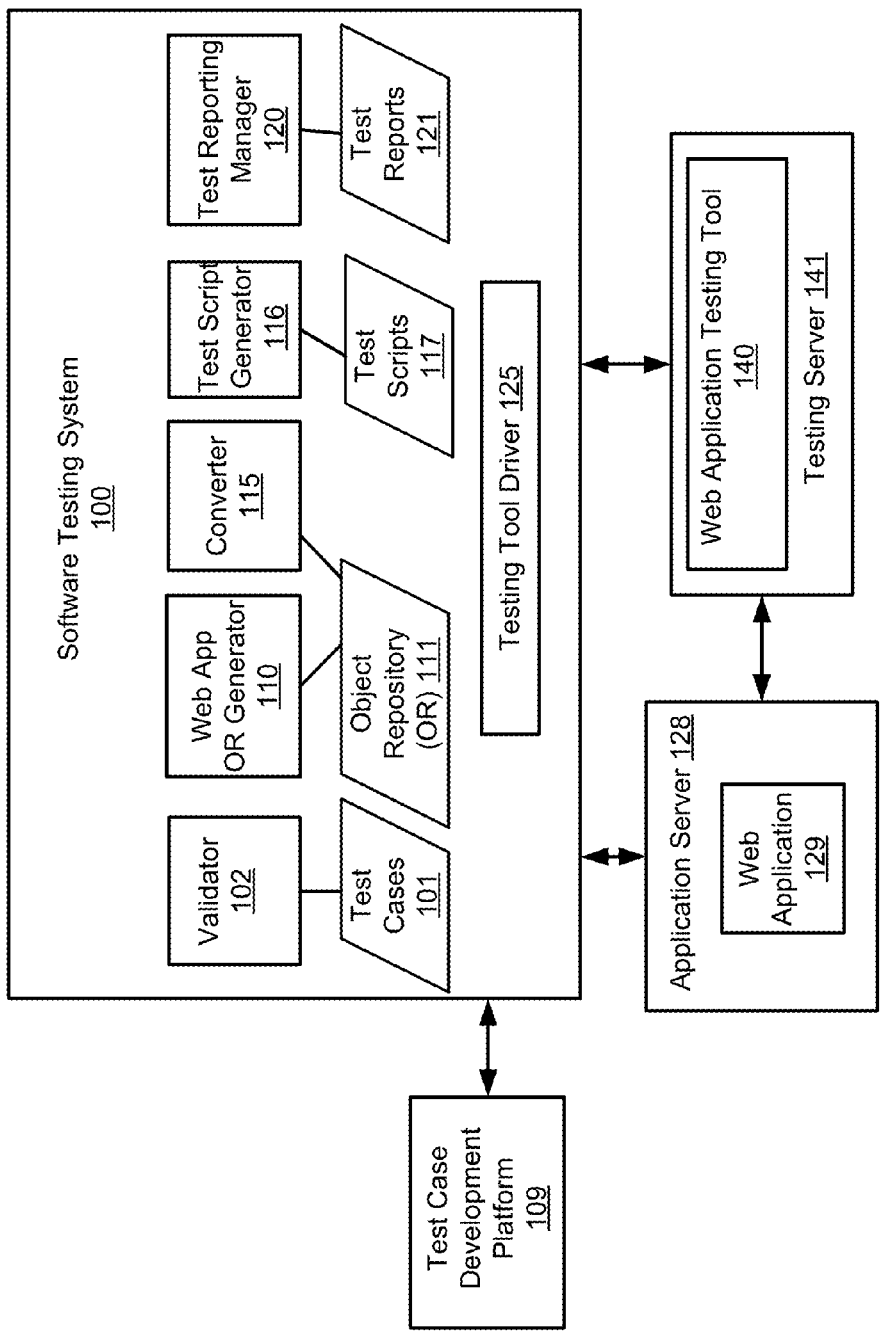
FIG. 1 illustrates components of a software testing system, according to an example of the present disclosure.

For simplicity and illustrative purposes, the present disclosure is described by referring mainly to examples thereof. In the following description, details are set forth in order to provide an understanding of the present disclosure. It will be readily apparent however, that the present disclosure may be practiced without limitation to these details. Also, throughout the present disclosure, the terms "a" and "an" are intended to denote at least one of a particular element. As used herein, the term "includes" means includes but not limited to, the term "including" means including but not limited to. The term "based on" means based at least in part on.

According to an example of the present disclosure, a software testing system can generate test scripts for execution by a web application testing tool to test a web application. A web application may include a client-server software application whereby the client or user interface runs in a web browser. For example, a user may interact with the web application, including providing information to the web application and viewing information generated by the web application, through a web browser. The user interface for the web application may be displayed in the web browser. The web application testing tool may include a software testing tool that can test functionalities of the web application via the web browser. The functionalities may include functionalities that perform operations based on user input received via the web browser and/or output provided by the web application to the user via the web browser.

The software testing system is operable to generate test scripts in an automated manner from test cases that may be written in a predetermined format. For example, the software testing system may receive test cases comprised of high-level descriptive steps of operations for testing functionalities of the web application. The software testing system may validate the test cases conform to the predetermined format, and execute a test script generation process to generate, from the test cases, test scripts that are in a programming language executable by the web application testing tool. The software testing system may invoke the web application testing tool to run the test scripts that it generated to test the web application according to the test cases.

The automated generation of test scripts performed by the software testing system can reduce the amount of errors generated in test scripts and allows non-developers and non-testers to automatically generate the test scripts from high-level descriptive steps provided in test cases. For example, a user that does not have knowledge of how to program test scripts may describe test cases using high-level descriptive steps including natural language constructs that are understandable by a lay person. The software testing system can convert the high-level descriptive steps to test scripts provided in the programming language understood by the testing tool executing the test scripts. Furthermore, it is not uncommon for web application developers and testers to create and execute thousands of test scripts daily, especially for new releases of a web application. This increases the opportunity for errors to be generated in the test scripts through the process of web application developers and testers programming the test scripts. The software testing system can minimize the opportunity for errors by converting the high-level descriptive steps to test scripts. Furthermore, for complex web applications, there may be situations where the testing is also complex. Realistically, it may be difficult for web application developers and testers to program the test scripts. The software testing system can automatically generate test scripts that may be difficult or impossible for a person to manually program.

FIG. 1 illustrates a software testing system 100, according to an example of the present disclosure. The software testing system 100 is referred to as the system 100. The system 100 may receive test cases 101 which may be identified by a user, for example, on test case development platform 109 or another system. The test case development platform 109 may be a text editor or a text case generation tool that allows a user to identify the test cases 101. A tool as used herein may comprise software.

The test cases 101 may include steps describing operations to be performed to test functionalities of web application 129. The functionalities being tested may include operations that can be performed by the web application 129. Functionalities may be simple, such as a login operation performed in response to clicking a login button on a user interface of the web application 129 and entering a valid user ID and password, or may be complex, such as performing complex calculations, data manipulations, data transformations, etc., based on user input or other data. The validator 102 determines whether the test cases 101 conform to a predetermined format. In an example, the validator 102 determines whether each of the test cases 101 are written in a predetermined format for expressing behavior and an expected outcome for a functionality of the web application 129 that is being tested by each of the test cases 101. The test cases 101 may be written in high-level steps. For example, the test cases 101 may be written in a simple domain-specific language (DSL) that uses natural language constructs (e.g., English-like sentences) that can express the behavior and the expected outcomes.

Web application object repository (OR) generator 110 may identify web objects of the web application 129, and generate an object repository (OR) 111 of the web objects, including properties of the web object. For example, the web application 129 may include web objects comprised of elements of one or more web pages of the web application 129. Examples of the web objects may include image objects, buttons, text boxes, tables, paragraphs, etc. The web objects may have properties, such as background and text colors, size of border, height and width of text box, etc. Other properties of web objects may include link properties (e.g., source of link, destination of link), paragraph properties, image properties, character properties, list properties, etc.

Additionally, test data and configuration data may be stored in the OR 111. The test data may include data provided by a user, such as via the test case development platform 109, and/or test data stored in a repository. For example, test data may be automatically generated via the system 100. A converter 115 of the system 100 may convert the web objects 213, test data, and configuration data to a generic format that can be used to generate the test scripts 117 as is further discussed below.

Test script generator 116 generates test scripts 117, for example, based on the test cases 101 validated by the validator 102 and web objects in the OR 111. As is further described below with respect to FIG. 2, the test script generator 116 may include step definitions that may be used to generate the test scripts 117 from the test cases 101 and the web objects and other information. The other information may include test data and configuration data, and it may be provided in the OR 111. The step definitions may be created and stored in a data storage of the system 100. The test scripts 117, for example, are generated in a programming language that can be understood and executed by the web application testing tool 140. The web application testing tool 140 may execute operations in a browser to test the web application 129. For example, the web application 129 is executed in a browser, and the web application testing tool 140 running the test script may perform operations, such as navigating a cursor to a button, clicking on a button, entering test data, etc., to test functionality of the web application 129.

In an example, the web application testing tool 140 may be SELENIUM, which is an open source web application testing tool. SELENIUM can emulate user operations in a browser and perform other operations to test a functionality of the web application 129. The test scripts 117 may be in a programming language supported by SELENIUM, such as JAVA, C#, GROOVY, PERL, PHP, PYTHON and RUBY. In another example, the web application testing tool 140 may include the CUCUMBER software testing tool. CUCUMBER may execute test cases that are written as GHERKIN scripts which are described below, and which conform to the behavior-driven development framework.

In another example, the web application testing tool 140 may include multiple web application testing tools for generating and executing the test scripts 117. For example, test cases may be validated to conform to the behavior-driven development framework by the Cucumber software testing tool, and the validated test cases output of the Cucumber software testing tool are converted to a test script including code executable by the SELENIUM software testing tool.

In an example, once the test scripts 117 are generated, the software testing system 100 may invoke the web application testing tool 140 to execute the test scripts through testing tool driver 125. The testing tool driver 125 may include an application program interface for connecting to the web application testing tool 140, providing the test scripts 117 to the web application testing tool 140, and receiving test results from the web application testing tool 140. Test reporting manager 120 may generate test results which may be displayed via a user interface in test reports 121. The test results may be determined from the web application testing tool 140 and/or may be determined by the test reporting manager 120. In example, the test reporting manager 120 may access log files generated by the web application 129, which may be stored on an application server 128 hosting the web application 129 to determine whether the web application 129 produced expected outcomes of the test cases 101. The web application testing tool 140 may send test results to the test reporting manager 120 which indicate whether the test cases 101 passed or failed. The web application testing tool 140 may be hosted on testing server 141, and the software testing system 100 may be hosted on a different server or the same server.

Figure 2:
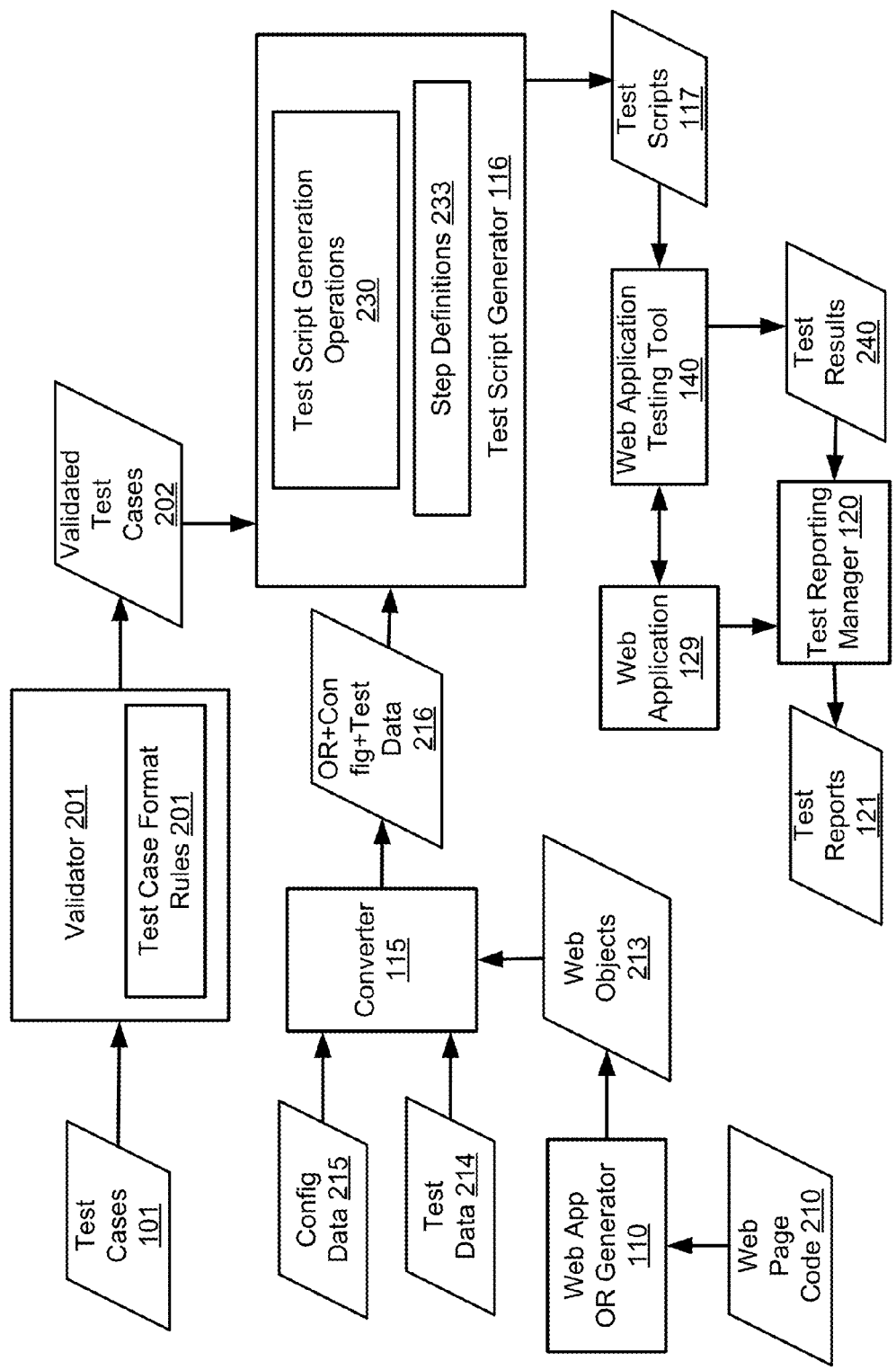
FIG. 2 illustrates a data flow diagram of the software testing system, according to an example of the present disclosure.

FIG. 2 shows an example of a data flow diagram for the system 100. The validator 201 may include test case format rules 201 to validate the test cases 101. The test case format rules 201 specify a predetermined format, which may include a defined syntax with keywords, and a defined sequence of steps. Test cases conforming to the predetermined format are validated. In an example, the predetermined format includes:

Given I <Action> on <Object> with <Data>;
When I <Action> on <Object> with <Data>;
Then I Should <Action> on <Object> with <Data>.

Each line in the test case may be referred to as a step. The "Given" and "When" steps generally describe context in terms of an action performed on an object, such as an object identified from the web application 129 and placed in the OR 111, with particular data. The "Then" step may describe an action to verify an outcome, such as shown by way of example in FIG. 3.

The validator 102 may determine whether each of the test cases 101 follow the format discussed above for test cases. There can be multiple steps for each of the "Given", "When", and "Then" steps. The "Given", "When", and "Then" steps may be provided in natural language constructs. In an example, the predetermined format follows behavior-driven development framework, which specifies that tests of any unit of software should be specified in terms of the desired behavior of the unit.

To validate that the test cases 101 conform to the predetermined format, the validator 102 may perform a check by a keywords search, for example, for "Given", "When", and "Then" as well as availability of "Action", "Object" and "Data". If the keywords are identified in a test case and the test case conforms to the predetermined format, then the test case may be validated. If a keyword is not found or a sequence of steps specified in the predetermined format is not followed, the validator 102 may generate an error message that may specify which step is missing. Then, the test case may be modified to conform to the predetermined format, and the validator 102 validates the test case again. This process is performed to validate the test cases 101. The validated test cases are shown as validated test cases 202.

Test data may be provided for the test cases. For example, if a login functionality is being tested, the test data may include a login name and password that should invoke a successful login action, and a login name and password that should invoke an unsuccessful login action to test whether the web application 129 generates the expected outcomes. Accordingly, successful and unsuccessful logins are tested by the scenarios in the test cases in this example.

In an example, the test cases 101 may be provided as Gherkin scripts. Gherkin is a domain specific language that allows describing software application behavior without detailing how that behavior is implemented. Other types of domain specific languages may be used to program the test cases. The test cases 101 may be provided in a feature file to the system 100. For example, the feature file may specify "Feature" followed by the feature name. This information is followed by scenarios that include test cases.

Figures 3B, 3C:
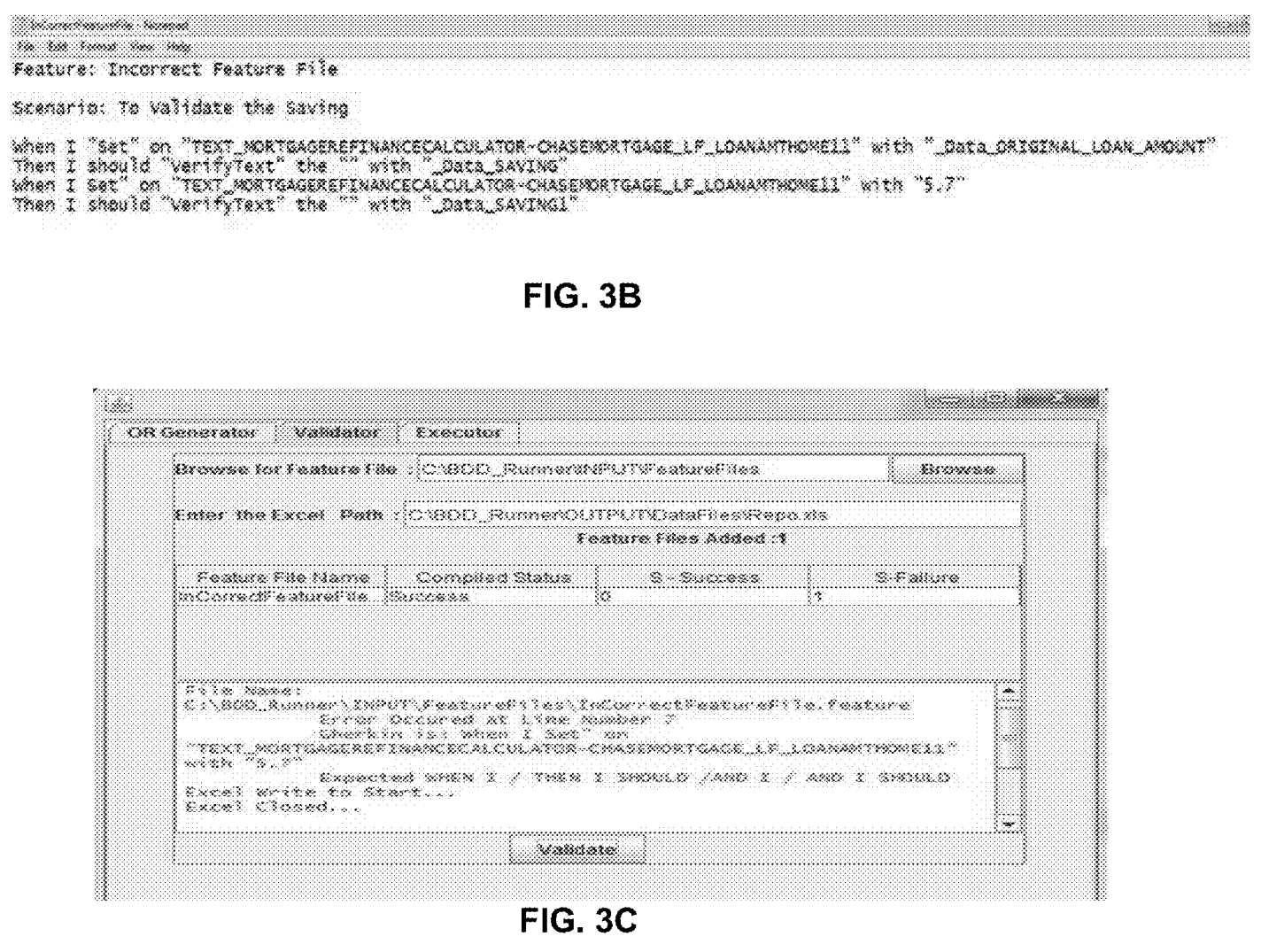

FIG. 3A shows an example of a test case. The test case, for example, is provided as a scenario in a feature file. The feature name is "Validate the Mortgage Refinance Calculator" and includes a scenario named "To Validate the Existence of all the fields and labels". The scenario follows the predetermined format. For example, the validator 102 identifies a "When" step, which is followed by "Then" steps comprising multiple steps connected by "And". This format follows the predetermined format, and the test case is validated. FIG. 3B shows an example of test case that does not follow the predetermined format and is not validated. The test case includes a scenario named "To Validate the Saving". As shown in FIG. 3C, the validator 102 may generate an error message in a user interface that identifies a validation error. For example, the second "When" step is an error because the validator 102 is expecting an "AND" step followed by the "Then" step.

Referring back to FIG. 2, the web application OR generator 110 generates OR 111 which includes web objects 213 extracted from web page code 210 of the web application 129. For example, web page code 210 of the web application 129 is parsed to identify known types of web objects, and the code of those web objects, including their properties, is extracted and saved in a specified destination file. Different tools and library functions may be available to parse the code and to extract predetermined types of web objects. For example, the web application OR generator 110 identifies the objects used in the web application 129, and a corresponding library function is invoked to perform a dump of the web objects 213 from the web page code 210 of the web application 129 to a destination file. A name and/or location of the destination file may be received by the system 100.

The location of a destination file may include a location identifier, such as an address, link, or another type of reference. In an example, the destination file to store the web objects 213 is a spreadsheet file. In an example, the web page code 210 may include Hyper Text Markup Language (HTML), JAVASCRIPT, PHP, PERL, etc. The invoked library function may identify the web objects 213 from the web page code 210, extract the web objects 213, and store the web objects 213 in the destination file.

Figure 4:
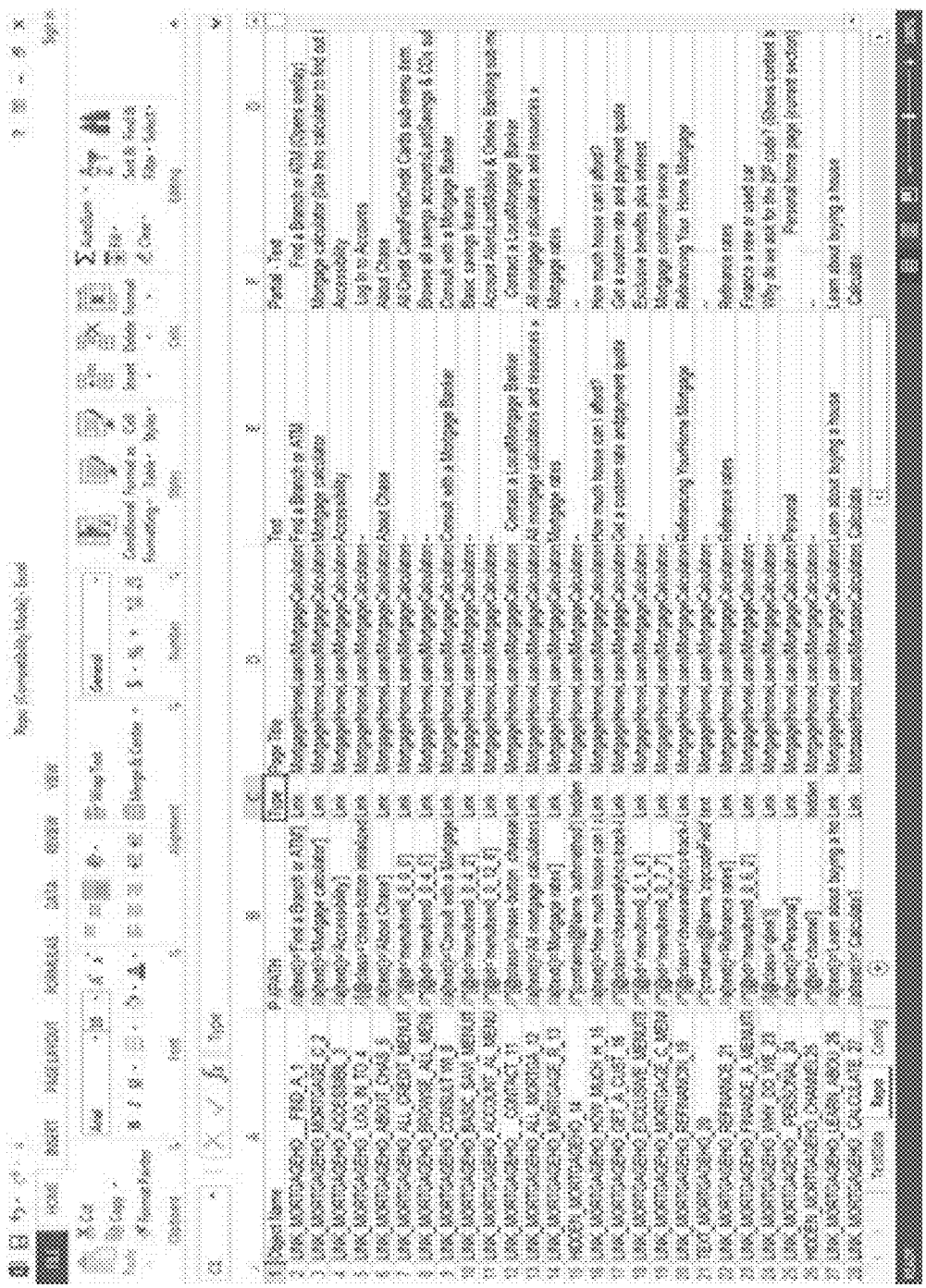
FIG. 4 illustrates web objects which may be extracted from a web application, according to an example of the present disclosure.

An example of the web objects 213 that are exported to a spreadsheet file to create the OR repository 111 is shown in FIG. 4. The Object Name may be used in test cases in a feature file to identify an object in a step in the test cases. P-XPATH is the unique X-Path for the reference in the web page. Type defines a property of the web objects 213. Page Title is the page title of the current web page. Text is text representing the element. Partial Text is a detailed specification of the text. This information may be extracted from the web page 210 of the web pages of the URL of the web application 129. In this example, and other examples described herein, the web application 129 is a home mortgage web application.

The converter 115 of the system 100 may convert the web objects 213, test data 214, and config data 215 (configuration data 215) to a generic format that can be used to generate the test scripts 117. 216 represents the web objects 213, test data 214, and config data 215 packaged in a generic format, which is readable by the test script generator 116. In an example, the generic format is programming-language-independent format for data. For example, the system 100 can take what is typically machine-specific and/or programming-language-specific information and make it into programming-language-independent information. This allows for portability and reuse of data that otherwise might not be transportable. An example of the generic format is JavaScript Object Notation (JSON). JSON is a commonly used data-interchange format for data exchanges between a backend server and a browser. FIG. 5A shows an example of the test data 214 which may be received by the system 100. The test data 214 may be stored in the OR repository 111 with the web objects 213. The test data may include test data for test cases represented by scenarios in a feature file. In an example, the web objects 213 may be provided in a spreadsheet file and the test data 214 is also included in the spreadsheet file.

The config data 215 may include additional information for generating the test scripts 117. For example, the config data 215 may identify browsers being used, drivers for the browsers, log file paths, snapshot paths, etc. The config data 215 may be entered by a user or another system. The converter 115 converts the web objects 213, the test data 214 and the config data 215 to the generic format. FIG. 5B shows an example of a JSON file generated by the converter 115, which includes the web objects 213, the test data 214 and the config data 215 in JSON format. In an example, a Visual Basic Script (VBscript) is used to convert an xls spreadsheet to JSON. For example, the VBscript reads each cell and converted each cell into a corresponding JSON object. VBscripts are available to perform this type of conversion.

Figure 3D:
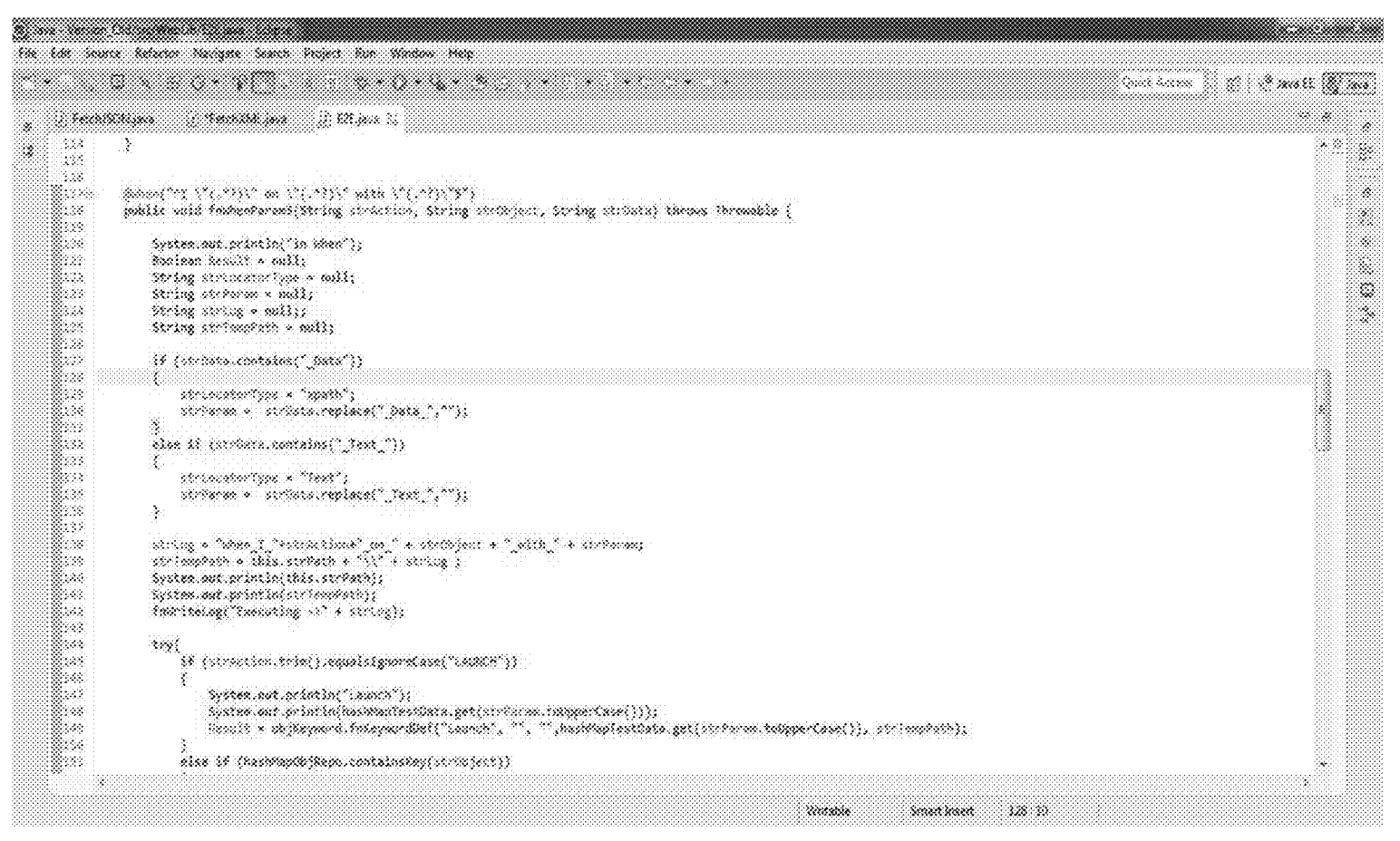
Figure 3E:
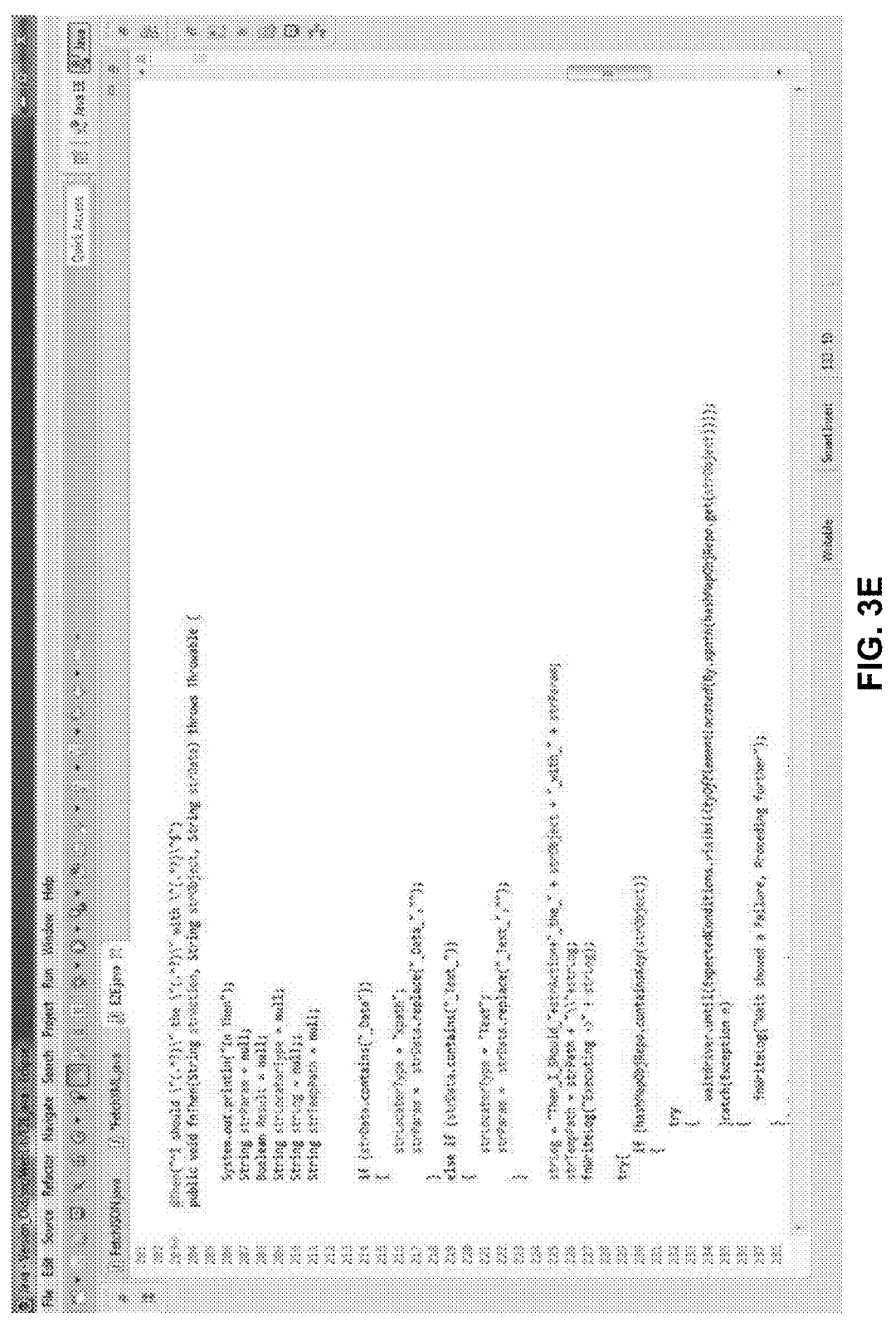

The test script generator 116 generates the test scripts 117 which may be executed by the web application testing tool 140 to test the web application 129. The test scripts 117 may be generated from the validated test cases 202, the web objects 213, the test data 214, and the config data 215. The test script generator 116 may execute test script generation operations 230 to generate the test scripts 117. For example, step definitions 233 may be stored at the system 100. A step definition may include a block of code to execute a step in a validated test case. The block of code may be executable by the web application testing tool 140. The test script generation operations 230 may include matching the steps in the validated test cases 202 to step definitions 233 to create the test scripts 117. The steps in the validated test cases 202 may include the steps discussed above, such as "Given", "When" and "Then" steps. The matching may be done by regular expression matching or string matching. For example, a string in a step of a validated test case is matched with a step definition, and the matching step definition is used in place of the step to create the test script for the validated test case. The test script shown in FIGS. 3D-E, for example, is generated by substituting matching step definitions for steps in the test case shown in FIG. 3A. FIG. 3D shows a portion of a test script that corresponds to the "When" step from FIG. 3A. FIG. 3E shows a portion of the test script that corresponds to the "Then" step from FIG. 3A. If steps from the test case cannot be matched then notifications may be generated that a test case was skipped so a user can modify the test case or create a matching step definition. In an example, the validated test cases 202 may be converted to the generic format, such as JSON or JAVA, and then the matching step definitions are identified for the test scripts 117.

Associated test data and web objects may be identified from the test data 214 and the web objects 213 for steps in the test case, and included as arguments in the corresponding step definitions. Regular expression matching or string matching may be used to identify the associated test data and web objects from the OR 111.

The matching step definitions and the associated test data and web objects, along with the config data 215, may be included in the test scripts 117. In an example, the test scripts 117 may be in JAVA or another programming language that is understandable by the web application testing tool 140. If SELENIUM is used as the web application testing tool 140, the test scripts 117 may be provided in JAVA or RUBY code. SELENIUM is used to execute the test case steps in the web browser to test functionalities of the web application 129.

Figure 6A:
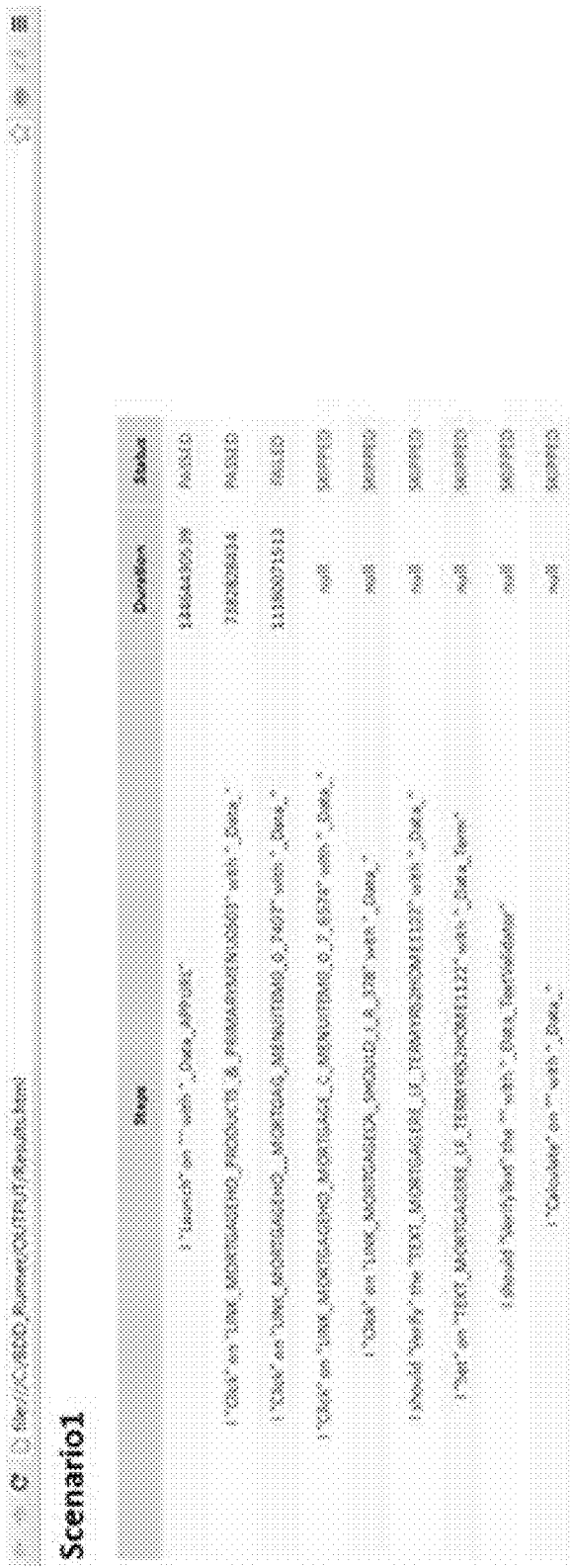
Figure 6B:
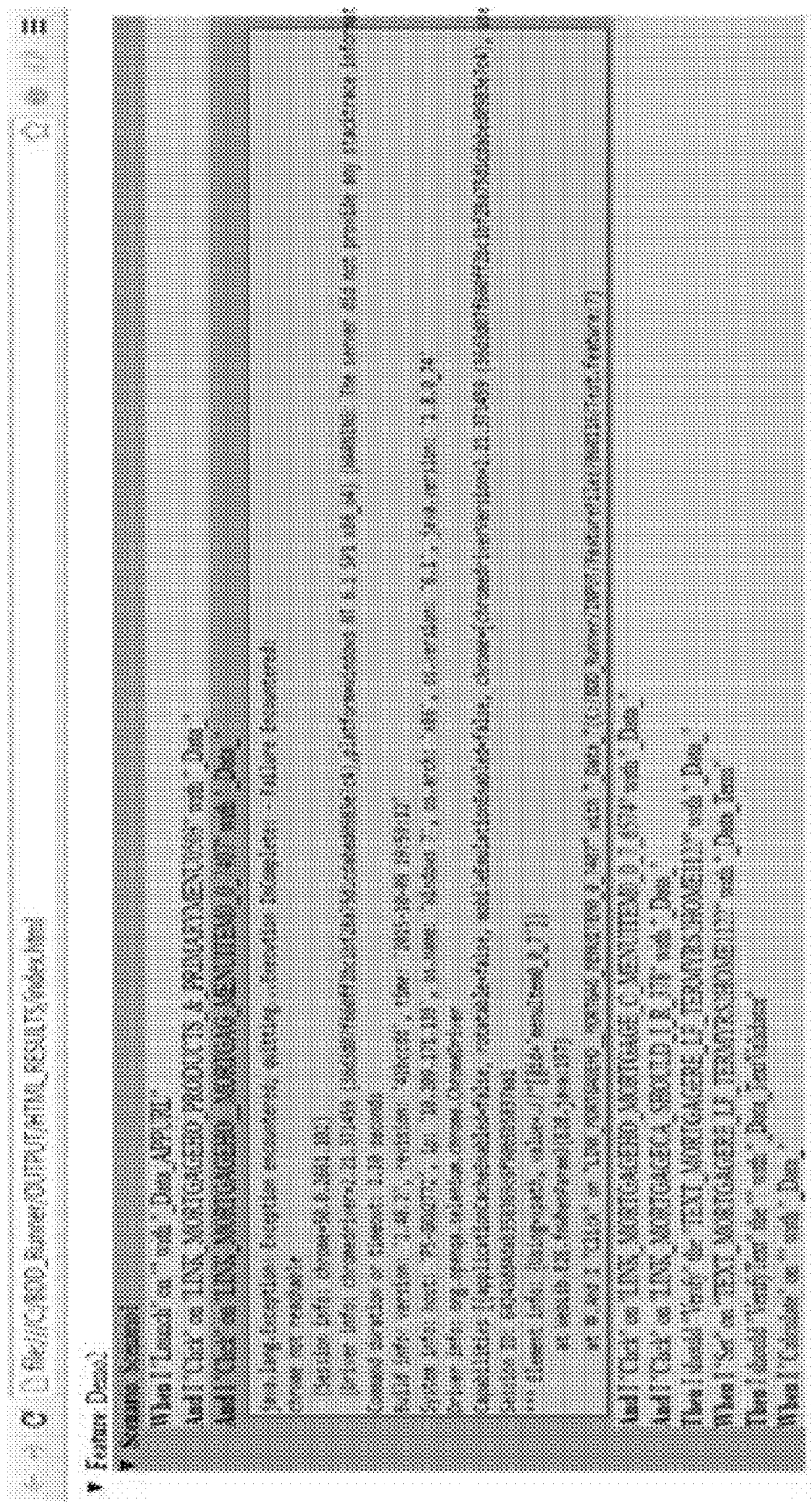

The web application testing tool 140 may generate test results 240 from running the test scripts 117. The test reporting manager 120 may manage the test results 240, including gathering and consolidating test results for each test case. Also, the web application 129 may generate log files which can be accessed to retrieve information about the test cases executed on the web application 129, and consolidated with the test results 240. The test reporting manager 120 may generate test reports 121 including the test results 240, information from log files capturing information pertaining to the executed test cases, and consolidated views of the test results 240 and the log files. In an example, the test results 240, snapshots of web pages of the web application 129, the log files, etc. are stored in folder, which may be specified by a user. FIG. 6A shows an example of an overview of test results for a test case embodied in a scenario. More detailed information may be provided that explains why tests failed. FIG. 6B shows an example of detailed information about a test failure. FIG. 6C shows an example of information that may be provided in a log file.

FIG. 7 shows a computer system 700 that may be used with the examples described herein. The computer system may represent a computational platform that includes components that may be in a server or another computer system. The computer system 700 may be used as part of a platform for the system 100. The computer system 700 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 700 may include a processor 702 that may implement or execute machine readable instructions performing some or all of the methods, functions and other processes described herein. Commands and data from the processor 702 may be communicated over a communication bus 704. The computer system may also include a main memory 706, such as a random access memory (RAM), where the machine readable instructions and data for the processor 702 may reside during runtime, and a secondary data storage 708, which may be non-volatile and stores machine readable instructions and data. The memory and data storage are examples of computer readable mediums. The memory 706 may include machine readable instructions residing in the memory 706 during runtime and executed by the processor 702. The memory 706 and/or the secondary data storage may store data used by the system 100, such as the object repository including web objects 213, configuration data, test data, etc.

The computer system 700 may include an I/O device 710, such as a keyboard, a mouse, a display, etc. A user interface (UI) 712 can be a display device that provides textual and graphical user interfaces to a user of the system 100. The U 1712 may operate with I/O device 710 to accept from and provide data to a user. The computer system may include a network interface 712 for connecting to a network. Other known electronic components may be added or substituted in the computer system. The processor 702 may be designated as a hardware processor. The processor 702 may execute various components of the system 100 described above and perform the methods described below.

Figure 8:
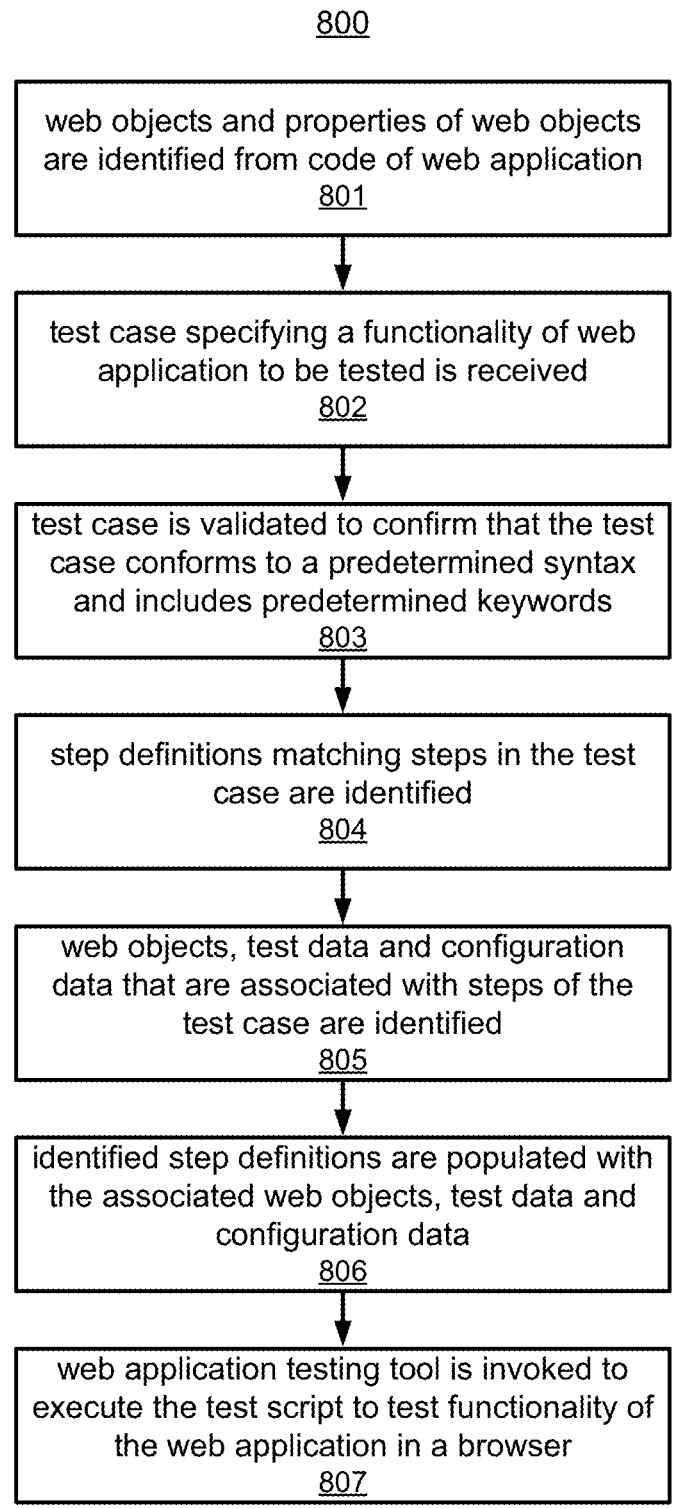
FIG. 8 illustrates a computer-implemented method, according to an example of the present disclosure.

FIG. 8 illustrates a flowchart of a computer-implemented method 800 for generating a test script for software testing. The method 800 may be implemented by the system 100 described above, or by other systems.

At 801, web objects and properties of web objects are identified from code of the web application 129. For example, a URL of the web application 129 is received, and code of web pages at the URL is parsed to extract web objects of the web application 129. For example, HTML that identifies different types of web objects may be stored and used to parse the code of web pages of the web application 129 to identify the web objects. Information for the extracted web objects is stored in the OR repository 111. Examples of the information, including properties of the web objects, is shown in FIG. 4. In an example, the OR repository 111 may include a file that contains the information for the extracted web objects, test data and configuration data including at least one parameter of a browser for running the web application 129.

At 802, a test case specifying a functionality of the web application to be tested is received. The test case may be created by a user or another system. The test case may include steps. The steps describe the functionality to be tested. Examples of steps are shown in FIG. 3A.

At 803, the test case is validated to confirm that the test case conforms to a predetermined syntax and includes predetermined keywords. The keywords, for example, include "Given", "When", and "Then" as well as the syntax described above with respect to the predetermined format. For example, the system 100 determines whether the test case includes steps including the keywords and whether the steps follow a predetermined sequence, such as a step with a "Given" step is followed by a step with a "When" step, which is followed by a step with a "Then" step, and whether the steps follow the predetermined syntax: Given I <Action> on <Object> with <Data>; When I <Action> on <Object> with <Data>; and Then I Should <Action> on <Object> with <Data>. The "Given" step may specify an initial context of the test case, and the "When" step may specify an event that occurs, and the "Then" step may specify an expected outcome. If the expected outcome is not generated by the web application 129, the test case is indicated as failed. Also, the steps may be specified in natural language constructs that follow grammar of a spoken language rather than the syntax of a programming language.

At 804, step definitions matching steps in the test case are identified. For example, the step definitions 233 are stored in data storage, and regular expression matching is performed to match each step in the test case to a stored step definition. If a stored step definition is not found, the system 100 may generate a message to indicate the step definition is not found, and a step definition may be created to match the step.

At 805, web objects, test data and configuration data from the OR 111 that are associated with the steps of the test case are identified. For example, a step or its matching step definition may reference a web object, and it is retrieved from the OR 111. Similarly, test data and configuration data may be retrieved from the OR 111. Examples of web objects, test data and configuration data is shown in FIG. 5B.

At 806, the step definitions identified at 804 are populated with the web objects, test data and configuration data determined at 805. For example, the step definitions include code executable by the web application testing tool 140. The code may include arguments where associated web objects and test data are included. Also, the code may include the configuration data for executing in a type of browser identified in the configuration data.

At 807, the web application testing tool 140 is invoked to execute the test script to test a functionality of the web application in a browser. The configuration data may specify one or more parameters for executing the test script in the browser. The testing tool driver 125 may send the test script to the web application testing tool 140 to execute the test script.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:
1. A software testing system comprising:
a memory to store machine readable instructions; and
a processor, connected to the memory, to execute the machine readable instructions to:
receive a uniform resource location of a web application;
access the web application at the uniform resource location to parse code of a web application to determine web objects of the web application and properties of the web objects;
receive a file location of a file to create an object repository;
create the object repository in the memory based on the received file location of the file;
extract the web objects of the web application and properties of the web objects determined from the parsed code into a file to create the object repository;
receive a test case specifying test steps for a test testing a functionality of the web application, the test steps specified in the test case using natural language constructs;
validate the test case, the validating comprising:
determining that the test steps conform to a predetermined syntax and that the test steps include predetermined keywords;
store test step definitions, the test step definitions including code blocks executable by a web application testing tool;
identify stored test step definitions matching the test steps in the test case;
identify web objects from the object repository that are associated with the test steps;
match at least one of the web objects with the test steps;
receive test data, the test data associated with the test steps;
identify test data in the received test data, the identified test data for use with the web application testing tool;
receive configuration data including a parameter of a browser for running the web application;
store the test data and the configuration data in the file to create the object repository;
convert the web objects and the properties, the test data, and the configuration data in the file to a programming-language independent data format for integrating the associated web objects, the associated test data, and the configuration data in the test script;
convert cells in a spreadsheet having data regarding the web objects to the associated web objects in the programming-language independent data format;
populate the identified test step definitions with the at least one matching web object and the identified test data to generate a test script executable by the web application testing tool; and
invoke the web application testing tool to execute the test script to test the functionality of the web application in a browser based on the configuration data.

2. The software testing system of claim 1, where the processor further executes the machine readable instructions to:
perform regular expression matching to identify the stored test step definitions that match the test steps in the test case.

3. The software testing system of claim 1, where the processor further executes the machine readable instructions to:
determine references to the web objects and the test data in the identified test step definitions; and
match the references to the web objects from the identified test step definitions to the web objects in the object repository to identify the stored web objects associated with the test steps.

4. The software testing system of claim 1, where the object repository including the web objects and the properties comprises:
for each web object, a web object name, a reference to a location of the web object in a web page of the web application, a type of the web object, a page title of the web page, and text describing the web object.

5. The software testing system of claim 1, where to validate the test case, the processor further executes the machine readable instructions to:
   determine whether the test steps conform to the predetermined syntax and include the predetermined keywords; and
   if the test steps conform, generate a message indicating the test case is validated, wherein the keywords includes "Given", "When", and "Then", and the predetermined syntax comprises the keywords used in test steps that follow a predetermined sequence.

6. The software testing system of claim 1, where the processor further executes the machine readable instructions to:
   receive test results from the web application testing tool;
   extract test result information from a log file of the web application; and
   generate a report including at least one of the test results and the extracted test result information.

7. The software testing system of claim 1, where the web application testing tool executes user interface operations in the browser according to the test script to test the web application.

8. The software testing system of claim 1, where to validate the test case, the processor further executes the machine readable instructions to:
   determine that the test steps include:
      an action to be performed on one or more of the web objects during the test, and
      an action to be verified from an outcome of the test; and
   generate an error message specifying missing steps corresponding to the one or more of the predetermined keywords, the generating performed when one or more of the predetermined keywords are missing in the test case.

9. A testing system to generate test scripts for testing a web application, the testing system comprising:
   a data storage to store test step definitions including code blocks executable by a web application testing tool;
   a memory to store machine readable instructions; and
   a processor, connected to the memory, to execute the machine readable instructions to:
      receive a uniform resource location of a web application;
      access the web application at the uniform resource location to parse code of a web application to determine web objects of the web application and properties of the web objects;
      receive a file location of a file to create an object repository;
      create an object repository in the memory based on the received location of the file;
      extract the web objects of the web application and properties of the web objects determined from the parsed code into a file to create the object repository;
      receive a test case specifying test steps for a test testing a functionality of the web application to be tested, the test steps specified in the test case using natural language constructs;
      validate the test case, the validating comprising:
         determining that the test steps conform to a predetermined syntax and that the test steps include predetermined keywords;
         identify stored test step definitions matching test steps in the test case;
         identify web objects from the object repository that are associated with the test steps;
         match at least one of the web objects with the test steps;
         receive test data associated with the test steps;
         identify test data in the received test data, the identified test data for use with the web application testing tool;
         receive configuration data including a parameter of a browser for running the web application;
         store the test data and the configuration data in the file to create the object repository;
         convert the web objects and the properties, the test data, and the configuration data in the file to a programming-language independent data format for integrating the associated web objects, the associated test data, and the configuration data in the test script;
         convert cells in a spreadsheet having data regarding the web objects to the associated web objects in the programming-language independent data format;
         populate the identified test step definitions with the at least one matching web object and the identified test data to generate a test script executable by the web application testing tool; and
         invoke the web application testing tool to execute the test script to test the functionality of the web application in the browser based on the configuration data.

10. The testing system of claim 9, where the processor further executes the machine readable instructions to:
    perform regular expression matching to identify the stored test step definitions that match the test steps in the test case.

11. The testing system of claim 9, where the processor further executes the machine readable instructions to:
    determine references to the web objects and the test data in the identified test step definitions; and
    match the references to the web objects from the identified test step definitions to web objects in the object repository to identify stored web objects associated with the test steps.

12. The testing system of claim 9, where the object repository includes, for each web object, a web object name, a reference to a location of the web object in a web page of the web application, a type of the web object, a page title of the web page, and text describing the web object.

13. The testing system of claim 9, where to validate the test case, the processor further executes the machine readable instructions to:
    determine whether the test steps conform to the predetermined syntax and include the predetermined keywords; and
    if the test steps conform, generate a message indicating the test case is validated.

14. The testing system of claim 13, wherein the keywords includes "Given", "When", and "Then", and the predetermined syntax comprises the keywords used in test steps that follow a predetermined sequence.

15. The testing system of claim 9, where the processor further executes the machine readable instructions to:
    receive test results from the web application testing tool;
    extract test result information from a log file of the web application; and
    generate a report including at least one of the test results and the extracted test result information.

16. The testing system of claim 9, where to validate the test case, the processor further executes the machine readable instructions to:
    determine that the test steps include:

an action to be performed on one or more of the web objects during the test, and
an action to be verified from an outcome of the test; and
generate an error message specifying missing steps corresponding to the one or more of the predetermined keywords, the generating performed when one or more of the predetermined keywords are missing in the test case.

17. A computer-implemented method for generating a test script to test a web application, the method comprising:
receiving a uniform resource location of the web application;
accessing the web application at the uniform resource location to parse the code of the web application to determine the web objects of the web application and properties of the web objects;
receiving a file location of a file to create an object repository;
creating the object repository in the memory based on a received location of the file;
extracting the web objects of the web application and properties of the web objects determined from the parsed code into a file to create the object repository;
receiving a test case specifying test steps for a test testing a functionality of the web application, the test steps specified in the test case using natural language constructs;
validating the test case, the validating comprising:
determining that the test steps conform to a predetermined syntax and that the test steps include predetermined keywords;
store test step definitions, the test step definitions including code blocks executable by a web application testing tool;
identifying stored test step definitions matching test steps in the test case;
identifying web objects from the object repository that are associated with the test steps;
matching at least one of the web objects with the test steps;
receiving test data associated with the test steps;
identifying test data in the received test data, the identified test data for use with the web application testing tool;
receiving configuration data including a parameter of a browser for running the web application;
store the test data and the configuration data in the file to create the object repository;
convert the web objects and the properties, the test data, and the configuration data in the file to a programming-language independent data format for integrating the associated web objects, the associated test data, and the configuration data in the test script;
convert cells in a spreadsheet having data regarding the web objects to the associated web objects in the programming-language independent data format;
populating the identified test step definitions with the at least one matching web object and the identified test data to generate a test script executable by the web application testing tool; and
invoking the web application testing tool to execute the test script to test the functionality of the web application in the browser based on the configuration data.

18. The computer-implemented method of claim 17, comprising:
generating an error message specifying missing steps corresponding to one or more of the predetermined keywords, the generating being performed when one or more of the predetermined keywords are missing in the test case.

19. The computer-implemented method of claim 17, wherein the test steps describe:
an action to be performed on an object during the test, and
an action to be verified from an outcome of the test.

* * * * *